(12) United States Patent
Su

(10) Patent No.: US 6,219,721 B1
(45) Date of Patent: Apr. 17, 2001

(54) COMPUTER IN WHICH MULTIPLE OPERATING SYSTEMS ARE INSTALLED IN DIFFERENT PERIPHERAL ACCESS DEVICES

(76) Inventor: Chen-Chang Su, No. 276, Chun Shan Rd., Chung Li City, Taoyuan Hsien (TW)

( * ) Notice: Subject to any disclaimer, the term of this patent is extended or adjusted under 35 U.S.C. 154(b) by 0 days.

(21) Appl. No.: 09/177,509

(22) Filed: Oct. 26, 1998

(51) Int. Cl.[7] .............................. G06F 13/00; G06F 3/00
(52) U.S. Cl. ..................... 710/2; 710/2; 710/5; 710/72
(58) Field of Search ................. 710/2, 3, 5, 62, 710/64, 72; 345/146; 379/209

(56) References Cited

U.S. PATENT DOCUMENTS 5,875,242 * 2/1999 Glaser et al. ..................... 379/207
5,973,666 * 10/1999 Challener et al. ................. 345/146

* cited by examiner

Primary Examiner—Thomas Lee
Assistant Examiner—Chun Cao
(74) Attorney, Agent, or Firm—Bacon & Thomas, PLLC

(57) ABSTRACT

A computer has different operating systems installed in different peripheral access devices thereof, and an operating system switch device controlled to select one operating system from the peripheral access devices for running, enabling the computer to be selectively operated under one of a set of operating systems.

6 Claims, 2 Drawing Sheets

COMPUTER IN WHICH MULTIPLE OPERATING SYSTEMS ARE INSTALLED IN DIFFERENT PERIPHERAL ACCESS DEVICES

BACKGROUND OF THE INVENTION

The present invention relates to computers, and more particularly to a computer which can be selectively operated under one of a set of operating systems.

The operation of a computer is subject to the management of an operating system (O.S), which imparts a communication between the application program (word processing software, image editing software, etc.) used by the user, and related hardware input/output devices or equipment (such as: keyboard, printer, scanner, hard disk drive, etc.), enabling the computer to process the user's input data, and to output a processed result, through the input/output devices or equipment. Following fast development of computer technology, a variety of new operating systems with new functions and technology have been developed. From the early single language (English) operating environment to current multilanguage (Chinese, Japanese, Russian) operating environments different operating systems are used to meet different requirements.

Early developed operating systems such as DOS 3.0, MS-DOS 4.0, are simple, and can be installed in a floppy disk. Recently developed operating systems such as Windows 95, Windows 98, are complicated, and must be installed in a hard disk drive, or another high capacity peripheral access device (for example, a CD-ROM).

Currently, communication between a computer and its related hard disk drive(s) or peripheral access device(s) is achieved through peripheral control interface means (IDE interface, enhanced IDE interface, etc.). In a computer system, only one peripheral access device is set to store an operating system, i.e., one computer can only be installed with one operating system. Therefore, same operating systems of different versions (for example, one Windows 95 of English version and one Windows 95 of Japanese version) cannot be installed in one computer. If a computer has to be operated under a different operating system, or a particular application software program must be operated under a particular operating system, reinstallation is needed when changing the operating system. For example, when Windows 95 of Japanese version is to be used instead of Windows 95 of English version, reinstallation is needed. In case the user needs to operate the computer under Windows 95 of English version again, and another reinstallation is needed. It is complicated to change an operating system, and much time is wasted when installing the operating system.

Furthermore, the installation of an operating system in a computer is not an easy job. When a reinstallation is achieved, related configuration settings are set again. Because the familiar configuration settings (for example, Windows 95's "table" settings) are changed after a reinstallation of the operating system, a certain period of tuning is inevitable to have the operating system reach the optimum status (the state most familiar to the user, including user interface, memory management, etc.).

There are two methods to let one computer be equipped with multiple operating systems. One method is the use of software to set multiple start zones in one peripheral access device, and to store different operating systems in the start zones separately, enabling the computer to be started by one of the installed operating systems. Available software include SYSTEM COM, PARTITION MAGIC, etc. The installation of these software is complicated, and only a well-trained person can do the job. Because different operating systems are installed in one peripheral access device, files from different operating systems may interfere with one another. Furthermore, it is difficult to remove different operating systems from one peripheral access device completely. Incomplete removal of abandoned operating systems may cause the computer to be unable to operate stably.

The other method of providing one computer with multiple operating systems is the use of detachable peripheral access devices. According to this method, different operating systems are installed in different detachable peripheral access devices, and the user can selectively install one detachable peripheral access device in the computer subject to the desired operating system. This method is not popularly accepted because a detachable peripheral access device tends to be damaged during its replacement.

SUMMARY OF THE INVENTION

The present invention has been accomplished with the above the circumstances in view. According to the present invention, different operating systems are installed in different peripheral access devices in a computer, and operating system switch means is provided and controlled to select one operating system from the peripheral access devices for running. Therefore, the computer is allowed to be selectively operated under one of a set of operating systems. Because different operating systems are installed in different peripheral access devices in the computer and selectively separately operated by means of the control of the system selection switch means, data related to different operating systems are separately maintained intact.

DETAILED DESCRIPTION OF THE PREFERRED EMBODIMENT

Figure 1:
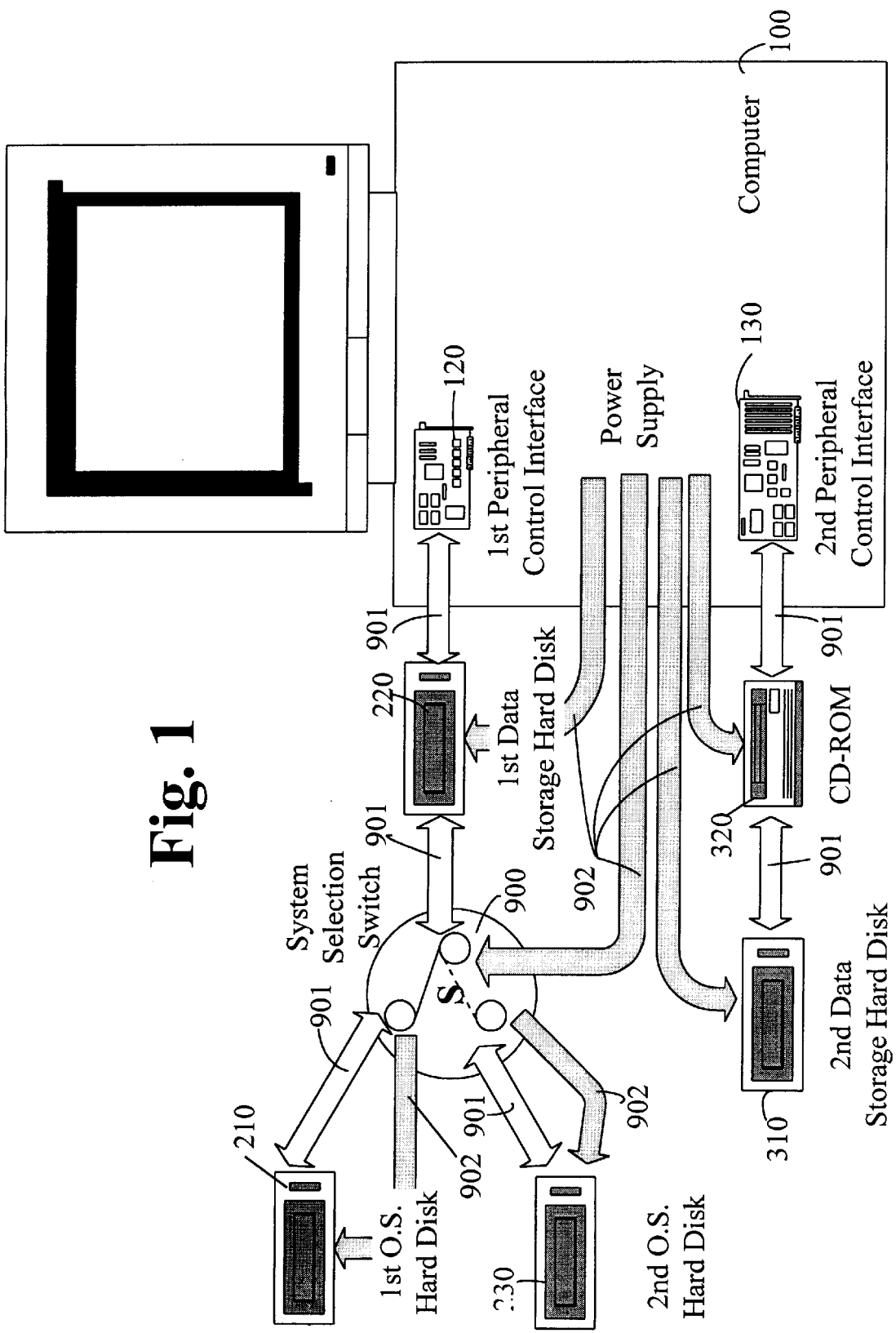
FIG. 1 is a system block diagram of a first embodiment of the present invention.

Referring to FIG. 1, a computer 100 is shown comprising a first peripheral control interface 120 and a second peripheral control interface 130. The first peripheral control interface 120 and the second peripheral control interface 130 are connected to peripheral access devices of the computer 100 by signal lines 901. The first peripheral control interface 120 is connected to a first data storage hard disk drive 220, and then to a system selection switch 900. The system selection switch 900 is further connected to a first operating system hard disk drive 210 and a second operating system hard disk drive 230. The second peripheral control interface 130 is connected to a CD-ROM 320, and then to a second data storage hard disk drive 310. The system selection switch 900 is connected to a power line 902 of the computer 100. The power line 902 provides the necessary working power supply to the operating system hard disk selected by the system selection switch 900.

The first operating system hard disk drive 210 and the second operation system hard disk drive 230 are peripheral access devices of same type, same model and same capacity, and respectively installed with a different operating system, i.e., the first operating system hard disk drive 210 is installed with a first operating system, and the second operating system 230 is installed with a second operating system.

When the power switch of the computer 100 is turned on, the system selection switch 900 is operated to select the first operating system hard disk drive 210 or the second operating system hard disk drive 230, enabling the computer 100 to start by means of the first operating system or the second operating system, and to operate under the accessed operating system.

When the first operating system hard disk drive 210 is selected to start the computer 100, the first operating system can be run to access the first data storage hard disk drive 220, the second data storage hard disk drive 310 and the CD-ROM 320, but the first operating system is prohibited from accessing data in the second operating system hard disk drive 230, therefore the configuration settings and data files of the second operating system are maintained intact.

Conversely, when the system selection system 900 is operated to select the second operating system hard disk drive 230, the second operating system can be run to access the first data storage hard disk drive 220, the second data storage hard disk drive 310 and the CD-ROM 320, but the second operating system is prohibited from accessing data in the first operating system hard disk drive 210, and therefore the configuration settings and data files of the first operating system are maintained intact.

Because different operating systems are installed in different peripheral access devices, different operating systems and the related settings and data files are independently operated without causing an interference, and other hardware resources of the computer, for example, the first data storage hard disk drive 220, the second data storage hard disk drive 310 and the CD-ROM 320 can freely be operated.

Figure 2:
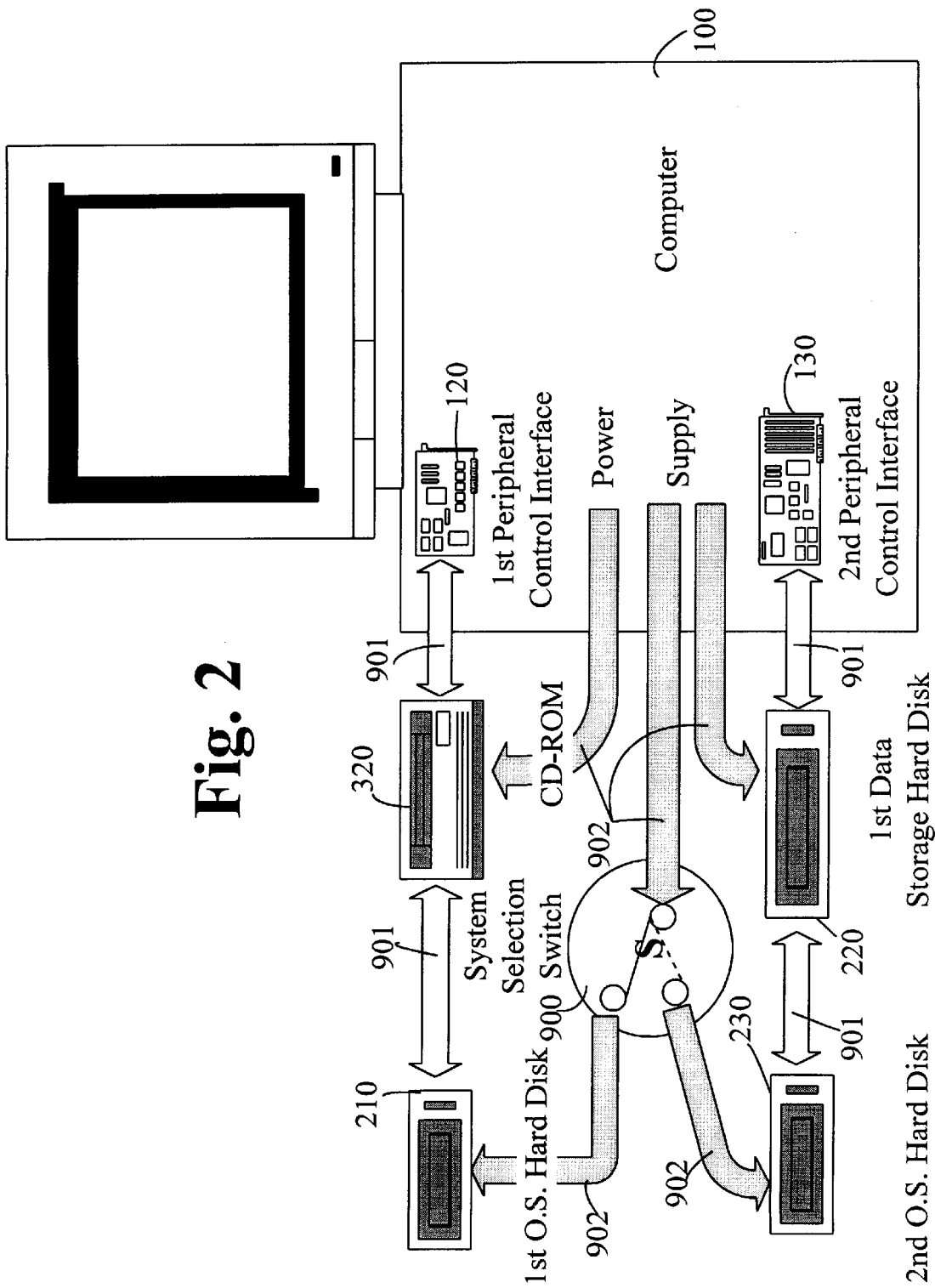
FIG. 2 is a system block diagram of a second embodiment of the present invention.

FIG. 2 is a system block diagram of a second embodiment of the present invention. According to this embodiment, the first peripheral control interface 120 is connected to the CD-ROM 320, and then to the first operating system hard disk drive 210; the second peripheral control interface 130 is connected to the first data storage hard disk drive 220, and then to the second operating system hard disk drive 230. In this embodiment, the system selection switch 900 is connected to a power line 902 of the computer 100. The power line 902 provides the necessary working power supply to the operating system hard selected by the system selection switch 900.

When the system selection switch 900 is selected to run the first operating system hard disk drive 210, the first operating system can be run to access the first data storage hard disk drive 220 and the CD-ROM 320. However the first operating system is prohibited from accessing data in the second operating system hard disk drive 230, and therefore the configuration settings and data files of the second operating system are maintained intact.

Conversely, when the system selection system 900 is operated to run the second operating system hard disk drive 230, the second operating system can be run to access the first data storage hard disk drive 220 and the CD-ROM 320, but the second operating system is prohibited from accessing data in the first operating system hard disk drive 210. Therefore the configuration settings and data files of the first operating system are maintained intact.

Because different operating systems are installed in different peripheral access devices, different operating systems and the related settings and data files are independently operated without causing an interference, and other hardware resources of the computer according to this embodiment, for example, the first data storage hard disk drive 220 and the CD-ROM 320 can freely be operated. Running a different operating system does not causes a limitation in the utilization of the hardware resources of the computer.

It is to be understood that the drawings are designed for purposes of illustration only, and are not intended as a definition of the limits and scope of the invention disclosed.

What the invention claimed is:

1. A computer comprising:

a plurality of peripheral access devices;

at least two different operating systems arranged to enable communications between an applications program running on said computer and input/output devices connected to said computer, and each of the at least two different operating systems being separately installed in a different one of said peripheral access devices;

a first peripheral control interface having one end connected to the computer and an opposite end connected to at least one of said peripheral access devices through a signal line and/or a power line;

at least one second peripheral control interface, said at least one second peripheral control interface each having one end connected to the computer and an opposite end connected to at least one of said peripheral access devices through a signal line and/or a power line; and system selection switch means having one end connected to one signal line and/or power line from said first peripheral control interface and said at least one second peripheral control interface, and an opposite end connected to said peripheral access devices by signal lines and/or power lines;

wherein said system selection switch means is controlled to selectively connect one of said peripheral access devices to said first peripheral control interface and said at least one second peripheral control interface, enabling one of said at least two operating systems to be run independently.

2. The computer of claim 1 wherein said peripheral access devices include at least one hard disk drive.

3. The computer of claim 1 wherein said peripheral access devices include at least one CD-ROM.

4. The computer of claim 1 wherein said peripheral access devices are of same type and same model.

5. The computer of claim 1 wherein said peripheral access devices are of different types and different models.

6. The computer of claim 1 wherein said first peripheral control interface and said at least one second peripheral control interface are interfaces of IDE (integrated device electronics).

* * * * *